United States Patent
Myers (10) Patent No.: US 12,097,923 B2
(45) Date of Patent: Sep. 24, 2024

(54) QUICK-RELEASE MOTORCYCLE ACCESSORY RACK

(71) Applicant: Gary Andrew Myers, Chandler, AZ (US)

(72) Inventor: Gary Andrew Myers, Chandler, AZ (US)

(*) Notice: Subject to any disclaimer, the term of this patent is extended or adjusted under 35 U.S.C. 154(b) by 10 days.

(21) Appl. No.: 17/737,835

(22) Filed: May 5, 2022

(65) Prior Publication Data
US 2022/0355883 A1    Nov. 10, 2022

Related U.S. Application Data

(60) Provisional application No. 63/184,633, filed on May 5, 2021.

(51) Int. Cl.
*B62J 50/21* (2020.01)
*B62J 11/04* (2020.01)

(52) U.S. Cl.
CPC .............. *B62J 50/225* (2020.02); *B62J 11/04* (2020.02)

(58) Field of Classification Search
CPC ................................. B62J 11/04; B62J 50/225
See application file for complete search history.

(56) References Cited

U.S. PATENT DOCUMENTS

2006/0243770 A1* 11/2006 Kortbein ............... B60R 9/00
224/547

FOREIGN PATENT DOCUMENTS

CN        201086772 Y  *  7/2008
CN        205497439 U  *  8/2016

* cited by examiner

*Primary Examiner* — Vicky A Johnson
(74) *Attorney, Agent, or Firm* — Schmeiser, Olsen & Watts LLP (57) ABSTRACT

An improved motorcycle accessory rack is disclosed. The rack may include a top plate, a bottom plate, a quick-release assembly, and mounting hardware. The mounting hardware may be for mounting the bottom plate to the handlebars of a motorcycle. The top plate may have slots through it for mounting any of a variety of accessory holders to it, such as a cell phone holder, a tablet holder, a GPS device holder, a drink holder, and the like, or combinations thereof. The top plate and bottom plate are quickly and easily attachable and detachable by a quick-release assembly between them by a user simply tightening or loosening a hand screw.

16 Claims, 6 Drawing Sheets

QUICK-RELEASE MOTORCYCLE ACCESSORY RACK

CROSS REFERENCE TO RELATED APPLICATION

This application claims priority to U.S. Provisional Patent Application Ser. No. 63/184,633, filed May 5, 2021, the disclosure of which is hereby incorporated entirely herein by reference

BACKGROUND OF THE INVENTION

Technical Field

This invention relates generally to motorcycle accessories and particularly to an improved motorcycle accessory rack for mounting any of a variety of accessories, or a combination thereof, to the handlebars of a motorcycle.

State of the Art

Many motorcycle riders use accessory mounts for mounting accessories, including mobile phones, computing tablets, GPS devices, drink holders, and the like, to the handlebars of a motorcycle for use while riding. However, many such accessory mounts are for mounting only a single specific accessory or one of a narrow class of accessories, do not allow for mounting multiple accessories at the same time, or do not feature accessory holders that are interchangeable, or easily interchangeable, with holders of other types of accessories.

Accordingly, what is needed is an improved accessory mount for mounting accessories to a motorcycle.

SUMMARY OF THE INVENTION

The present invention relates to motorcycle accessories and particularly to an improved motorcycle accessory rack for mounting any of a variety of accessories, or a combination thereof, to the handlebars of a motorcycle.

Embodiments of a quick-release motorcycle accessory rack may comprise a top plate, a bottom plate, a quick-release assembly, and mounting hardware, wherein the quick-release assembly may comprise a top block and a bottom block assembly. The top plate may comprise a plurality of apertures therethrough for coupling the top plate to the top block of the quick-release assembly, as well as a plurality of slots therethrough for coupling any of a variety of accessory holders thereto. The bottom plate may comprise a plurality of apertures therethrough for coupling the bottom plate to a main body of the bottom block assembly, as well as a plurality of slots therethrough for coupling a pair of mounting brackets thereto for mounting the rack to the handlebars of a motorcycle.

The bottom block assembly may comprise a main body coupled to the bottom plate and a securing body that mates to the main body and is removably secured thereto by a hand screw that may be hand-tightened or -loosened by a user. Each of the main body and the securing body may comprise a lip configured to be inserted into a corresponding groove of a pair of grooves in the top block, wherein the top block may be removably coupled to the bottom block assembly and secured thereto by the user tightening the hand screw. The top block may be quickly and easily removed again by the user loosening the hand screw. In this way, the top plate, with the top block coupled thereto, and with or without at least one accessory holder mounted thereto, may be quickly and easily attached to and detached from the bottom plate having the bottom block assembly coupled thereto and mounted to the handlebars of a motorcycle by the mounting brackets.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to motorcycle accessories and particularly to an improved motorcycle accessory rack for mounting any of a variety of accessories, or a combination thereof, to the handlebars of a motorcycle.

Referring to the drawings, embodiments of a quick-release motorcycle accessory rack 10 may comprise a top plate 12, a bottom plate 14, a quick-release assembly 16, and mounting hardware 18.

Figure 2:
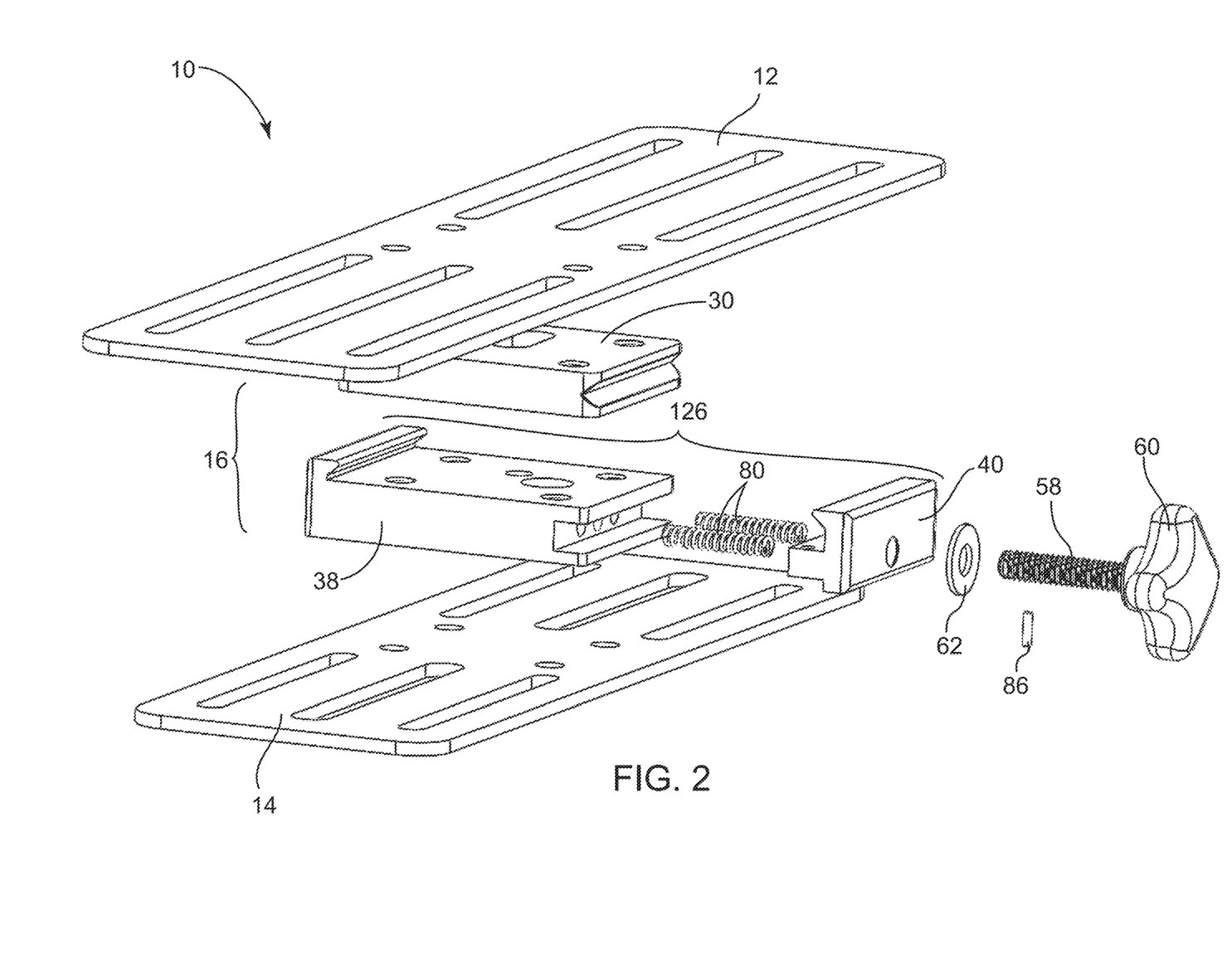
FIG. 2 is a perspective view of a quick-release motorcycle accessory rack, according to an embodiment.
Figure 3:
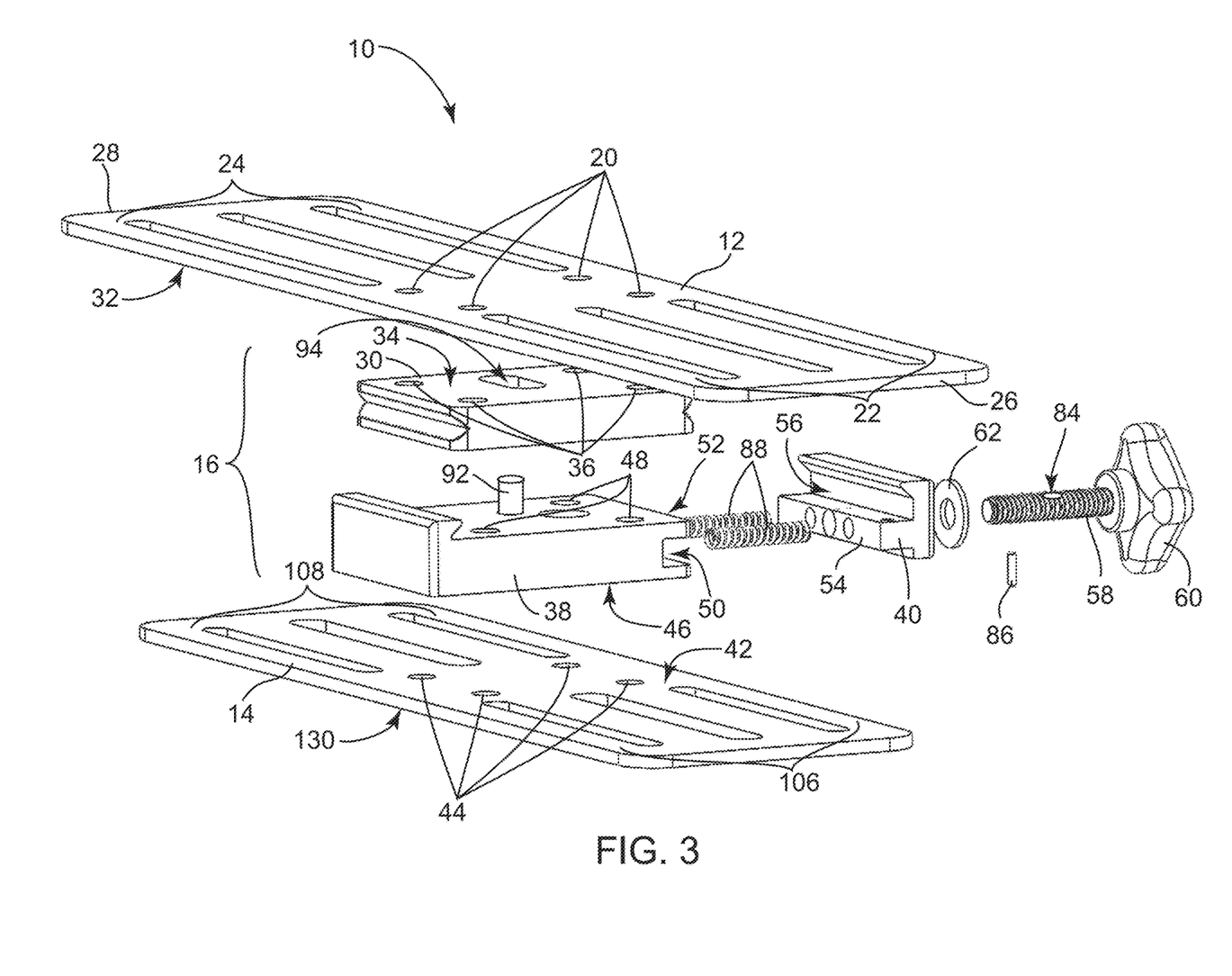
FIG. 3 is an alternative perspective view of a quick-release motorcycle accessory rack, according to the embodiment of FIG. 2.

In some embodiments, as shown in FIGS. 2 and 3, the top plate 12 may be substantially identical to the bottom plate 14, wherein each of the top plate 12 and the bottom plate 14 may be made of a rigid sheet material having a width that is greater than its length. Each of the top plate 12 and the bottom plate 14 may comprise a plurality of slots and apertures therethrough for insertion of various hardware therethrough for coupling the plate to another component. For example, in some embodiments, the top plate 12 may comprise four apertures 20 therethrough disposed in a rectangular array about the center of the top plate 12, a first set of three lateral parallel slots 22 proximate a first side 26 thereof, and a second set of three lateral parallel slots 24 proximate a second side 28 thereof.

In some embodiments, a quick-release assembly 16 may comprise a top block 30 coupled to a bottom surface 32 of the top plate 12, such as by mounting screws inserted through the apertures 20 in the top plate 12 and into corresponding threaded recesses 36 in a top surface 34 of the top block 30, and a bottom block assembly 126 comprising a main body 38 and a securing body 40, the main body 38 being coupled to a top surface 42 of the bottom plate 14, such as by mounting screws inserted through the apertures 44 in the bottom plate 14 and into corresponding threaded recesses 48 in a bottom surface 46 of the main body 38.

Figure 5:
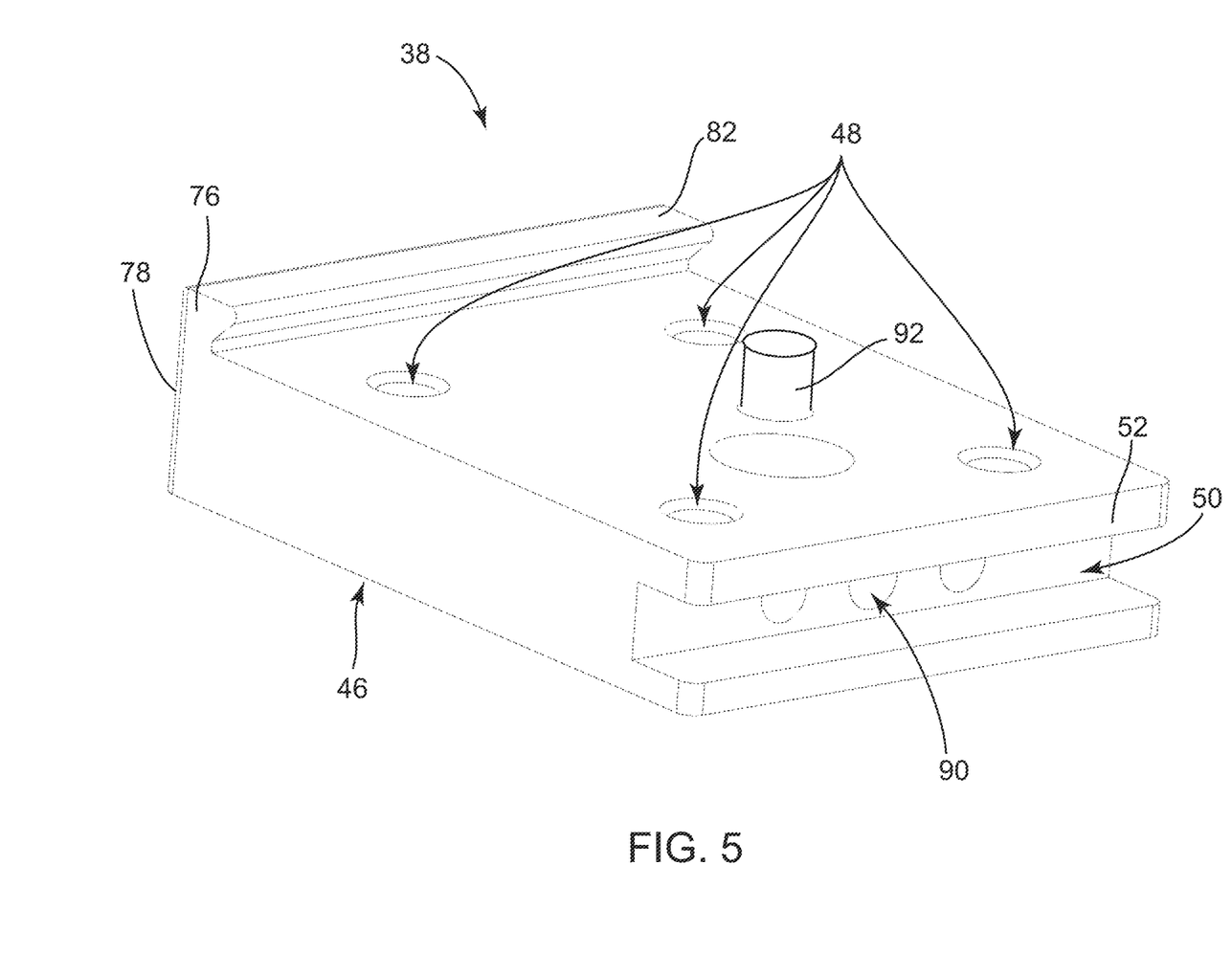
FIG. 5 is a perspective view of a main body of a bottom block assembly of a quick-release assembly of a quick-release motorcycle accessory rack, according to the embodiment of FIG. 2.
Figure 6:
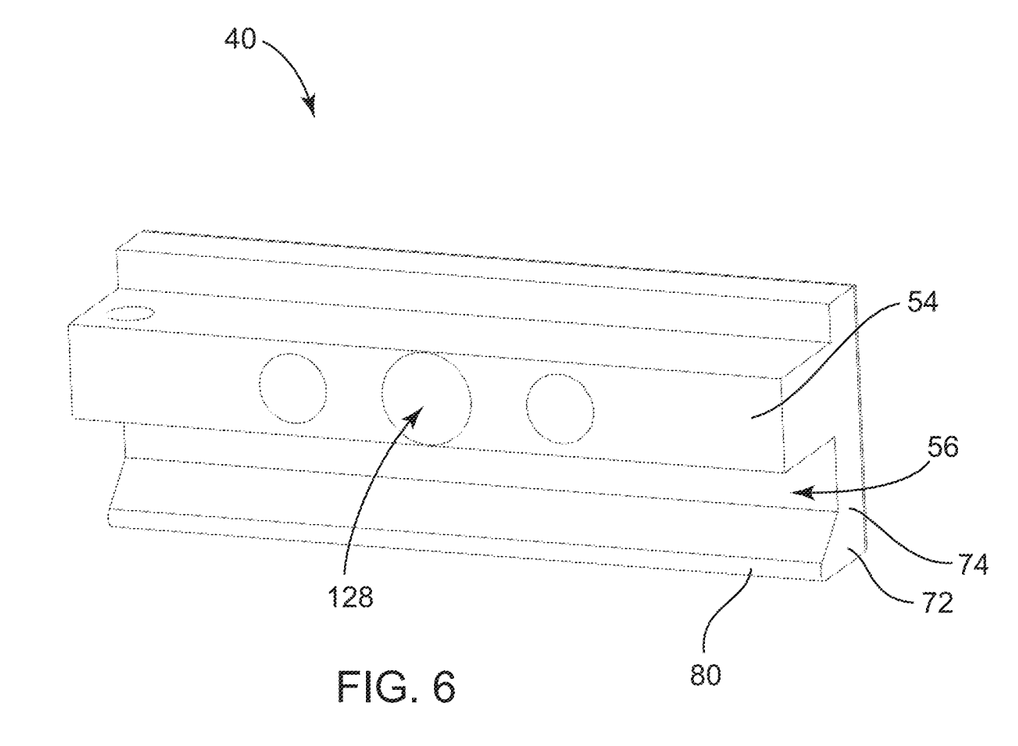
FIG. 6 is a perspective view of a securing body of a quick-release assembly of a quick-release motorcycle accessory rack, according to the embodiment of FIG. 2.

The main body 38 of the bottom block assembly 126 may comprise a slot 50 along a first end 52 thereof, and the securing body 40 may comprise a corresponding protrusion 54 along an inner surface 56 thereof, wherein the slot 50 is configured to receive the protrusion 54 slidingly inserted thereinto, the main body 38 and securing body 40 assembly together thereby forming the bottom block assembly 126. The securing body 40 may be releasably secured to the main body 38, such as by a hand screw 58 inserted through a hand screw aperture 128 in the securing body 40 and into a threaded hand screw recess 90 in the main body 38. The hand screw 58 may comprise a handle 60, which a user may grasp to hand-tighten or -loosen the hand screw 58 to secure the securing body 40 to the main body 38 or remove it therefrom. In some embodiments a washer, such as a flat washer 62, may be disposed between the handle 60 and the securing body 40, the hand screw 58 being inserted through the washer 62.

Figure 4:
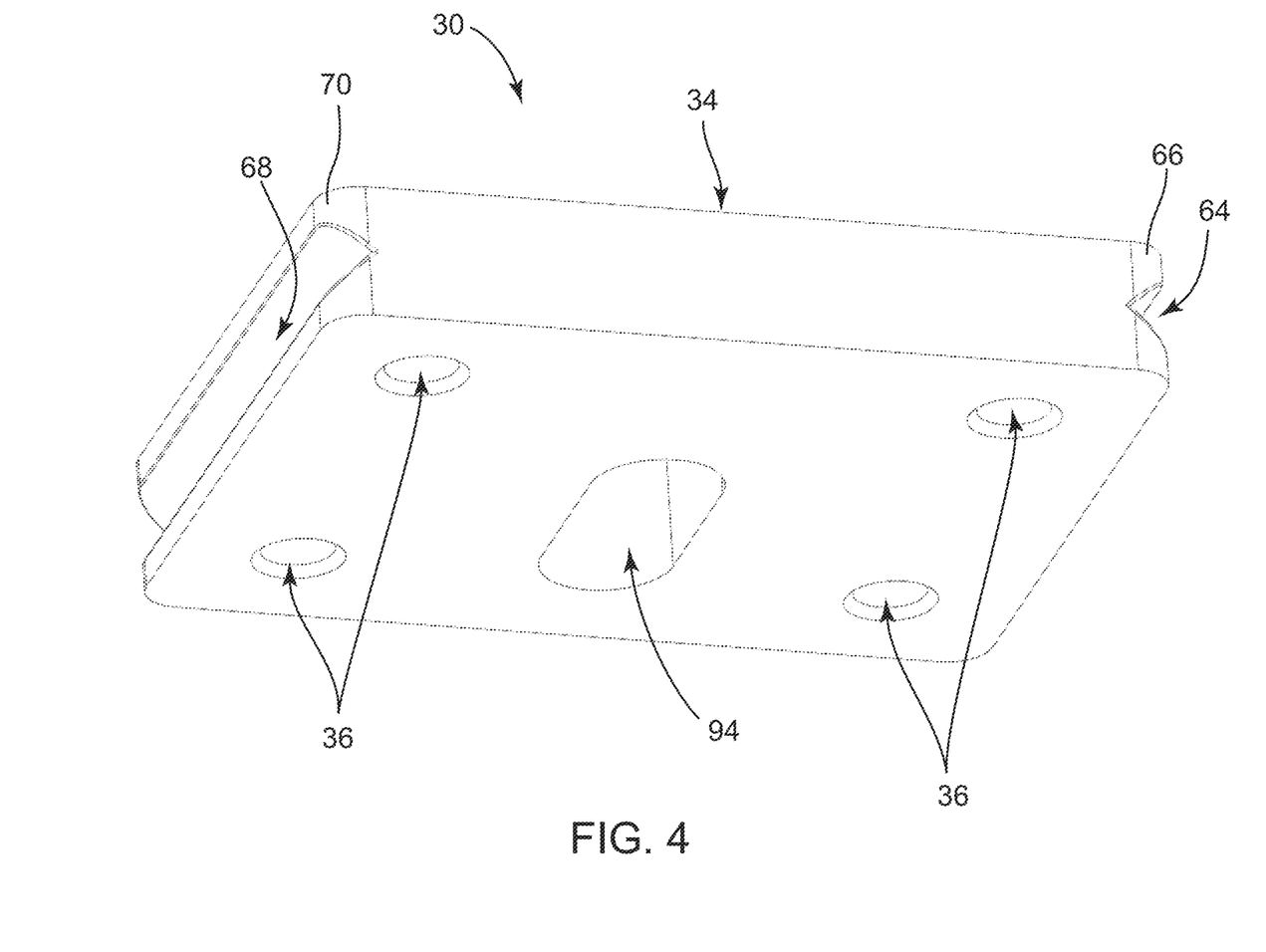
FIG. 4 is a perspective view of a top block of a quick-release assembly of a quick-release motorcycle accessory rack, according to the embodiment of FIG. 2.

The top block 30 may comprise a first groove 64 along the width of a first end 66 thereof and a second groove 68 along the width of a second end 70 thereof. The bottom block assembly 126 may comprise a first ridge 72 extending upward along the width of a first end 74 of the securing body 40 and a second ridge 76 extending upward along the width of a second end 78 of the main body 38, wherein the first ridge 72 comprises a first inward-facing lip 80 extending therefrom and configured to be inserted into the first groove 64 of the top block 30, and the second ridge 76 comprises a second inward-facing lip 82 extending therefrom and configured to be inserted into the second groove 68 of the top block 30, thereby removably securing the top block 30 to the bottom block assembly 126 when the hand screw 58 is tightened. In a preferred embodiment, the first and second grooves 64 and 68 and corresponding first and second lips 80 and 82 each have a V-shaped profile. However, this is not intended to be limiting, as the profile may be of any of a variety of shapes consistent with the intended function thereof, as described.

In some embodiments, the hand screw 58 may comprise a lateral pin aperture 84 therethrough for receiving a retaining pin 86, wherein the retaining pin 86 has a length that is greater than the diameter of the hand screw 58. The pin aperture 84 may be disposed a distance from the handle 60 corresponding to the depth of the hand screw aperture 128 of the securing body 40, such that the securing body 40 is disposed between the handle 60 and the retaining pin 86. In such embodiments, the hand screw aperture 128 is of sufficient diameter to allow the hand screw 58 to rotate freely within. The retaining pin 86 prevents the securing body 40 from falling off the hand screw 58 when the hand screw 58 is loosened and removed from the main body 38. Furthermore, in some embodiments, at least one spring 88 may be disposed between the main body 38 and the securing body 40 for biasing the securing body 40 away from the main body 38. For example, a pair of springs 88 may be disposed between the main body 38 and the securing body 40 on either side of the hand screw 58. In practice, the hand screw 58 may be loosened to remove the securing body 40 from the main body 38, wherein as the hand screw 58 rotates, the retaining pin 86 maintains the securing body 40 against the handle 60, and the at least one spring 88 maintains friction between the threads of the hand screw 58 and corresponding threads of the hand screw recess 90 of the main body 38 by biasing the securing body 40 away from the main body 38. In this way, by loosening the hand screw 58, the distance between the first and second lips 80 and 82 may be increased to allow for insertion and removal of the top block 30 to and from the bottom block assembly 126, respectively. With the top block 30 inserted, the hand screw 58 may be tightened, thereby decreasing the distance between the first and second lips 80 and 82 to firmly secure the top block 30 to the bottom block assembly 126.

In some embodiments, the main body 38 of the bottom block assembly 126 may further comprise a holding pin 92 extending upward therefrom and configured to be inserted within a corresponding holding pin recess 94 in the top block 30. The holding pin 92 prevents the top block 30 from sliding and falling off the bottom block assembly 126 when the hand screw 58 is loosened. In some embodiments, the holding pin recess 94 may be of a much larger diameter than the diameter of the holding pin 92 to allow a user to easily match the top block 30 to the bottom block assembly 126 without difficulty of matching or lining up the holding pin 92 with a holding pin recess 94 of smaller diameter. This allows the top block 30 to slide a short distance relative to the bottom block assembly 126 while the hand screw 58 is not tight, but not so much that it may fall off. In other embodiments (not shown), the top block 30 may comprise a holding pin 92 extending downward therefrom, and the main body 38 of the bottom block assembly 126 may comprise a corresponding holding pin recess 94.

Figure 1:
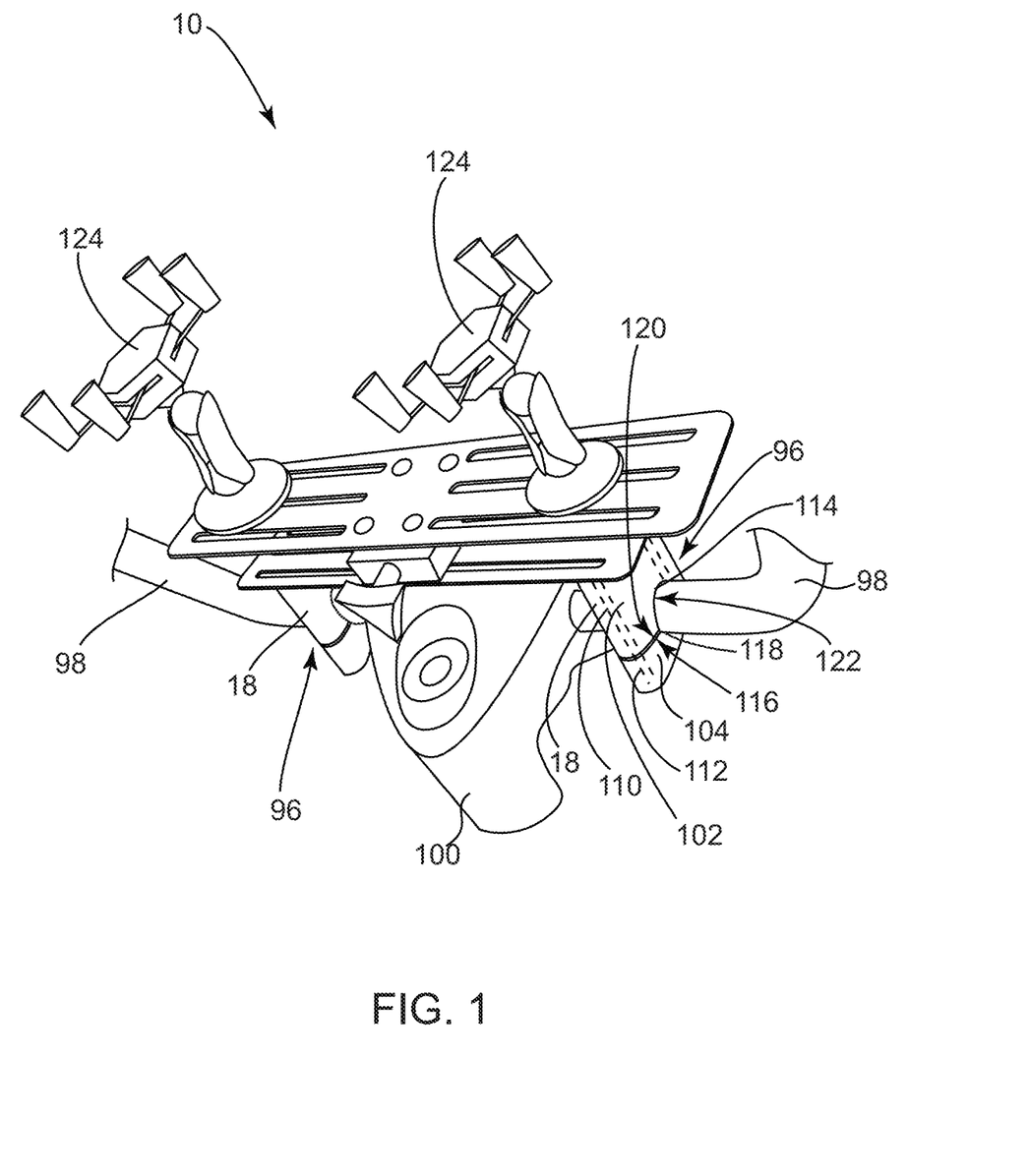
FIG. 1 is a perspective view of a quick-release motorcycle accessory rack, according to an embodiment of the present invention, shown mounted to the handlebars of a motorcycle.

Embodiments of a quick-release motorcycle accessory rack 10 may comprise mounting hardware 18 configured for removably coupling the rack 10 to a motorcycle 100, such as to the handlebars 98 of the motorcycle 100, for example, as shown in FIG. 1. Some embodiments may comprise a pair of two-piece mounting blocks 96 coupled to the bottom plate 14. Each of the pair of two-piece mounting blocks 96 may comprise a first part 102 and a second part 104, wherein the mounting block 96 may be coupled to a bottom surface 130 of the bottom plate 14 by inserting a pair of mounting screws through corresponding slots of one of the sets of parallel lateral slots 106 and 108 of the bottom plate 14, through corresponding mounting screw apertures 110 in the first part 102, and into corresponding threaded mounting screw apertures 112 in the second part 104. The first part 102 may comprise a lateral recess 114 along a bottom surface 116 thereof and the second part 104 may comprise a corresponding lateral recess 118 along a top surface 120 thereof, wherein, when the first part 102 is coupled to the second part 104, a handlebar aperture 122 is formed laterally through the first part 102 and second part 104 assembly. The handlebar aperture 122 may be configured to receive a handlebar 98 of a motorcycle 100 therethrough for removably coupling the quick-release motorcycle accessory rack 10 to the motorcycle 100. The other mounting block 96 of the pair of mounting blocks 96 may be configured, in a similar manner, to couple the opposed end of the bottom plate 14 to the opposite handlebar 98 of the motorcycle 100. The length of the slots of the two sets of slots 106 and 108 in the bottom plate 14 through which the mounting screws are inserted allows for adjustment of the disposition of the mounting blocks 96 relative to the bottom plate 14 and the motorcycle handlebars 98, wherein the user may slide the mounting blocks 96 in either direction, side to side, to adjust the location of the mounting blocks 96 on the handlebars 98 to a desired location thereon and to adjust the bottom plate 14 in either direction, side to side, to adjust the location of the bottom plate 14 on the mounting blocks 96 to a desired location thereon, before tightening the mounting screws.

Any of a variety of accessory holders 124, such as a cell phone holder, a tablet holder, a GPS device holder, a cup holder, and the like, or any combination thereof, may be coupled to the top plate 12, such as by utilizing the slots of the two sets of lateral slots 22 and 24 in the top plate 12 for mounting such accessory holders 124 thereto. The length of the slots of the two sets of slots 22 and 24 through the top plate 12 allows for adjustment of any accessory holder 124 coupled thereto to any of a variety of positions relative to the top plate 12 as may be desired by a user.

In operation, the bottom plate 14, having the bottom block assembly 126 coupled thereto, may be coupled by the mounting blocks 96 to the handlebars 98 of a motorcycle 100. The user may loosen the hand screw 58 without removing the hand screw 58 completely from the main body 38 of the bottom block assembly 126. With at least one accessory holder 124 coupled to the top plate 12, and the top plate 12 being coupled to the top block 30, the user may quickly and easily match the top block 30 to the bottom block assembly 126 by inserting the second lip 82 into the second groove 68 with the holding pin 92 inserted into the holding pin recess 94, then simply tighten the hand screw 58 to insert the first lip 80 into the first groove 64 to secure the bottom block assembly 126 to the top block 30. The top plate 12, along with the at least one accessory holder 124 and top block 30 coupled thereto, may be easily removed by reversing this procedure.

The components defining any quick-release motorcycle accessory rack 10 may be formed of any of many different types of materials or combinations thereof that can readily be formed into shaped objects provided that the components selected are consistent with the intended operation of a quick-release motorcycle accessory rack 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any quick-release motorcycle accessory rack 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g., a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A motorcycle accessory rack comprising:
 a top plate having a plurality of top plate apertures therethrough, and a plurality of top plate slots therethrough for coupling of accessory holders thereto;
 a bottom plate;
 a quick release assembly having a top block and a bottom block assembly, wherein the plurality of top plate apertures couples the top plate to the top block; and
 mounting hardware.

2. The motorcycle accessory rack of claim 1, wherein the bottom plate comprises a plurality of bottom plate apertures therethrough for coupling the bottom plate to a main body of the bottom block assembly.

3. The motorcycle accessory rack of claim 1, wherein the bottom plate comprises a plurality of bottom plate slots therethrough for coupling a pair of mounting brackets thereto.

4. The motorcycle accessory rack of claim 3, wherein the mounting brackets are configured for mounting the motorcycle accessory rack to handlebars of a motorcycle.

5. The motorcycle accessory rack of claim 1, wherein the bottom block assembly comprises a main body coupled to the bottom plate and a securing body, wherein the securing body mates to the main body and is removably secured thereto.

6. The motorcycle accessory rack of claim 5, wherein the securing body is removably secured to the main body by a hand screw.

7. The motorcycle accessory rack of claim 6, wherein the hand screw is configured to be hand tightened or hand loosened.

8. The motorcycle accessory rack of claim 7, wherein the hand screw comprises a handle.

9. The motorcycle accessory rack of claim 8, wherein a washer is disposed between the handle and the securing body.

10. The motorcycle accessory rack of claim 6, wherein the hand screw comprises a lateral pin aperture therethrough for receiving a retaining pin.

11. The motorcycle accessory rack of claim 5, wherein each of the main body and the securing body comprises a lip configured to be inserted into a corresponding groove of a pair of grooves in the top block.

12. The motorcycle accessory rack of claim 5, wherein the top block is removably coupled to the bottom block assembly.

13. A motorcycle having a motorcycle accessory rack, the motorcycle accessory rack comprising:

a top plate having a plurality of top plate apertures therethrough, and a plurality of top plate slots therethrough for coupling of accessory holders thereto;

a bottom plate;

a quick release assembly having a top block assembly and a bottom block assembly, wherein the plurality of top plate apertures couples the top plate to the top block assembly; and mounting hardware.

14. The motorcycle of claim 13, wherein the bottom plate comprises a plurality of bottom plate slots therethrough for coupling a pair of mounting brackets thereto and wherein the mounting brackets are configured for mounting the motorcycle accessory rack to handlebars of the motorcycle.

15. The motorcycle of claim 13, wherein the bottom block assembly comprises a main body coupled to the bottom plate and a securing body, wherein the securing body mates to the main body and is removably secured thereto.

16. The motorcycle accessory rack of claim 15, wherein the securing body is removably secured to the main body by a hand screw.

\* \* \* \* \*